Oct. 21, 1969  R. W. BROWN  3,474,332
ELECTROMECHANICAL TRANSDUCER HAVING A LINEAR OUTPUT
Filed July 21, 1967

INVENTOR.
RICHARD W. BROWN
BY
Dugger, Peterson, Johnson & Westman
ATTORNEYS

United States Patent Office 3,474,332
Patented Oct. 21, 1969

3,474,332
ELECTROMECHANICAL TRANSDUCER HAVING A LINEAR OUTPUT
Richard W. Brown, Excelsior, Minn., assignor to Control Data Corporation, Minneapolis, Minn., a corporation of Minnesota
Filed July 21, 1967, Ser. No. 655,073
Int. Cl. G01r 29/20
U.S. Cl. 324—34                          1 Claim

ABSTRACT OF THE DISCLOSURE

A winding is employed in each leg of a multivibrator. When a movable core is centrally disposed with respect to both windings, two transistors alternately conduct for equal intervals. When the core is displaced from such a null position, one transistor will conduct for a longer period than the other, thereby providing an indication of the relative position of the core with respect to the winding.

BACKGROUND OF THE INVENTION

Field of the invention

This invention relates to electromechanical transducers in which a core is movable relative to a pair of windings, the position of the core influencing the inductance of each of the windings.

Description of the prior art

The closest known prior art is the conventional differential transformer. Differential transformers, it might be explained, make use of a primary or excitation winding plus a pair of secondary or pick-up windings. Differential transformers provide very small output signals due to the poor coupling between the primary and secondary windings. Also, they cannot be used past the null position unless complex phase detection circuitry is employed. Furthermore, in order to derive an output signal proportional to core displacement, the excitation voltage impressed on the primary winding must be closely regulated; even so, changes in ambient temperature will affect the resistance of the primary winding and thus introduce an error in the output reading obtained via the secondary windings.

SUMMARY OF THE INVENTION

The present invention is a simplification over the differential transformer type of transducer, for it requires only two windings, the inductance of one being increased and the inductance of the other decreased as the core is moved in the direction of one and away from the other winding. The change in inductance of one winding with respect to the other affords a facile way of controlling the switching action of a multivibrator, since one side of the multivibrator can be made to conduct for a longer period than the other side dependent upon whether one coil is being influenced to a greater or lesser degree by the core.

One object of the invention is to provide an electromagnetic transducer that requires exceedingly simple circuitry and which transducer is not temperature sensitive.

Another object of the invention is to provide a relatively large output signal from a transducer with very little input power thereto.

A further object of the invention is to provide a fairly high level signal with a low impedance level. In this way, the invention will find especial utility in telemetering because of the low impedance level and the fairly high level signal that is derived, thereby allowing the windings and core to be located at a remote vantage poit. Also, it is to be noted that the transducer arrangement envisaged by the present invention is not susceptible to picking up noise due to its low impedance direct current level.

Yet another object of the invention is to provide a transducer utilizing a movable core that coacts with a pair of windings but does not require complex phase detection circuitry to indicate when the core has passed through its null position intermediate the windings.

DESCRIPTION OF THE PREFERRED EMBODIMENT

Figure 1:
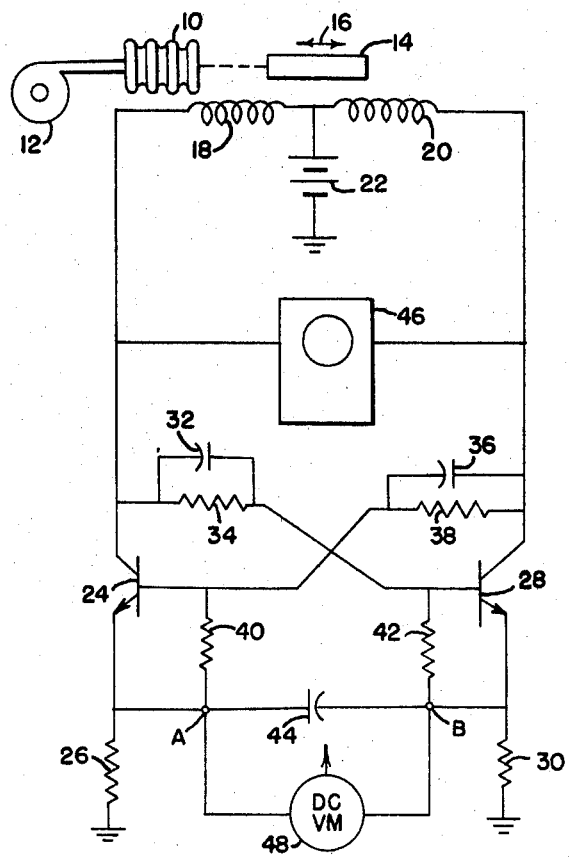
FIGURE 1 is a schematic representation of one embodiment exemplifying my invention.

Referring now to FIGURE 1, a pressure sensitive bellows 10 has been illustrated which is responsive to the pressure developed by a compressor 12. These components are not part of the invention but serve to illustrate a particular application to which the invention may be put.

A movable core 14 is connected to the bellows 10 so the core is capable of moving to the left or right as indicated by the arrow 16. In a proximal relationship with the core 14 are first and second windings 18 and 20, the core 14 when it moves to the left increasing the inductance of the winding 18 and at the same time decreasing the inductance of the winding 20, and vice versa when the core 14 moves to the right.

A source of direct current power is furnished in the form of a battery 22. More specifically, the voltage supplied by the battery 22 can be on the order of 10 volts. The positive side of the battery is connected to the juncture of the windings 18, 20 and the negative side is grounded.

Considering the winding 18, it will be observed that the left end of this winding is connected directly to the collector electrode of an NPN transistor 24, the emitter electrode of the transistor 24 being connected to ground through a resistor 26. Similarly, the right end of the winding 20 is connected to the collector electrode of another NPN transistor 28, the emitter electrode of this transistor being connected to ground through a resistor 30.

A pair of cross-coupling networks are employed for alternately switching the transistors 24 and 28 from a non-conductive to a conductive state. The first of these networks includes a capacitor 32 shunted by a resistor 34. It will be seen that the capacitors 32 and 34 are joined at the left and thereby connected directly to the collector electrode of the transistor 24. The other cross-coupling network includes a capacitor 36 and a resistor 38 in parallel therewith. The right side of the capacitor 36 and the resistor 38 are joined together and connected directly to the collector electrode of the transistor 28. The other sides of the capacitor 32 and the resistor 34 are joined and are connected directly to the base of the transistor 28, whereas the other sides of the capacitor 36 and the resistor 38 are connected to the base electrode of the transistor 24. Extending from the base electrode of the transistor 24 to a terminal A is another resistor 40 and still another resistor 42 extends from the base electrode of the transistor 28 to a terminal B.

A capacitor 44 is connected between the terminals A and B so that a charge is placed on the capacitor 44 in accordance with the potentials appearing at the terminals A and B. Also connected between the terminals A and B is a direct current voltmeter, the voltmeter reading positively in one situation to be presently described and negatively in a second condition.

Connected between the collector electrodes of the transistors 24, 28 is a cathode ray tube oscilloscope labeled 46.

From the description given above, it will be appreciated that the transistors 24 and 28 are alternately switched into a conductive and non-conductive state, respectively. The cross-coupling networks 32, 34 and 36, 38 simply cause the transistors to conduct for certain intervals that will hereinafter be described. However, at this stage of the description, it should be recognized that the circuitry connected to the windings 18 and 20 constitutes a multivibrator, the functioning of which is relatively well understood.

Figure 2:
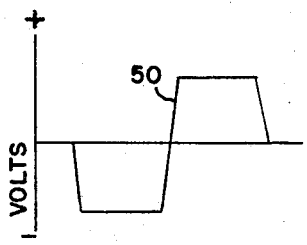
FIGURE 2 illustrates the collector-to-collector voltage waveform when the core is centrally positioned as illustrated in FIGURE 1.
Figure 3:
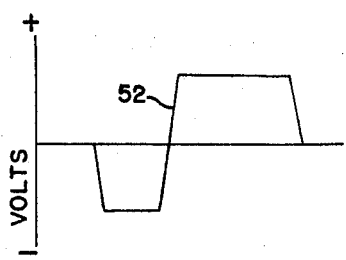
FIGURE 3 is a waveform similar to FIGURE 2 but with the core displaced to the left.
Figure 4:
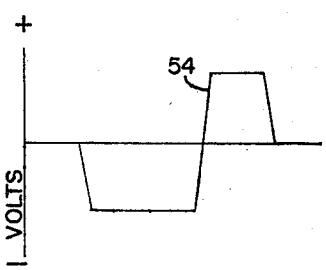
FIGURE 4 is a waveform like FIGURE 3 but with the core displaced to the right.

It will be of assistance, though, to refer to the voltage waveforms appearing in FIGURES 2, 3 and 4. FIGURE 2 represents the voltage existing between the collectors of the transistors 24 and 28 when the transistors are alternately conducting for equal intervals. This is when the core 14 is centrally disposed with respect to the windings 18 and 20. This waveform has been given the reference numeral 50.

When the core 14 moves to the left so that more of it is associated with the winding 18 than with the winding 20, then the inductance of the winding 18 is changed with respect to the inductance of the winding 20, being increased in this instance. Hence, the waveform 52 of FIGURE 3 is representative of this positioning of the core 14. More specifically, the transistor 24, under this set of conditions, conducts for a shorter period than does the transistor 28.

On the other hand, when the core 14 is shifted to the right so it magnetically influences the winding 20 more than the winding 18, the inductance picture is reversed from that set forth in the paragraph immediately above. The waveform that results in this situation has been labeled 54, being presented in FIGURE 4.

Figure 5:
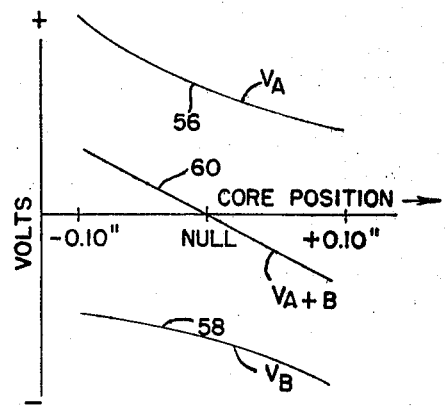
FIGURE 5 is a graphical representation of certain voltages plotted with respect to core position.

It will be of further assistance to illustrate how the voltage appearing at the terminals A and B varies in magnitude with respect to the core position. Accordingly, FIGURE 5 is plotted with the voltage at these terminals A and B as the ordinate and the core position as the abscissa. The voltage at the terminal A for various positions of the core 14 has been given reference numeral 56 and has also been identified as $V_A$. Similarly, still referring to FIGURE 5, the voltage at terminal B has been assigned the reference numeral 58 and also identified as $V_B$. The algebraic summation graph has been given reference numeral 60 and has also been identified as $V_{A+B}$.

Although the operation of my electromechanical transducer is believed obvious from the information presented above, especially when taken in conjunction with the information graphically portrayed in FIGURES 2-5, nonetheless a brief description of the operation will be of help in appreciating the various benefits to be derived from a practicing of my invention. Accordingly, assuming the core 14 is centrally disposed with respect to the windings 18 and 20 and also further assuming that the transistor 24 is conducting more heavily than the transistor 28, more current will flow in the base circuitry of the transistor 24 than in the base circuit of the transistor 28. As the collector current in the transistor 34 increases, the collector voltage will decrease from a relatively high positive value provided by the battery 22. More specifically, it will be recognized that when there is no conduction of the transistor 24, then the collector electrode of this transistor is, in effect, connected directly to the battery 22. However, a flow of current through the winding 18 causes a voltage drop and the collector voltage is under these circumstances less positive than when the transistor 24 is cut off or non-conducting. This decreasing positive voltage, or increasing negative voltage, is applied through the capacitor 32 to the base electrode of the transistor 28. Inasmuch as the transistors 24 and 28 are both of the NPN type, the making of the base more negative results in a rapid decrease in the base current of the transistor 28 and also a decrease in the collector current of this transistor. Consequently, the collector voltage of the transistor 28 becomes more positive because as the collector current decreases, there is a lesser potential drop across the winding 20.

The increase in a positive direction of the collector voltage of the transistor 28 is fed back to the base of the transistor 24 via the network 36, 38. Owing to the fact that the transistor 24 is of the NPN type, the forward bias of the transistor 24 is increased with the consequence that this transistor is driven more into its saturated condition.

A point is reached where the base voltage of the transistor 28 is made so negative with respect to the emitter that this transistor is cut off and only the transistor 24 is conductive. This is the manner in which the transistor 24, which we have assumed for the sake of discussion to be conductive, is rendered conductive and the transistor 28 is rendered non-conductive.

As already explained, the collector electrode of the transistor 24 is becoming more and more negative as compared to what the voltage was prior to conduction of the transistor 24. At any rate, this action transpires so rapidly that the capacitor 32 does not get the opportunity to discharge and virtually all the negative voltage at the collector electrode of the transistor 24 appears across the resistor 42 and the resistor 30, the resistor 30 being connected to ground. However, as the capacitor 32 discharges through its parallel resistor 34, more of the previously increased negative voltage appears across the capacitor 32 and less across the resistors 42 and 30. This decreases the reverse bias applied to the base electrode of the transistor 28. When the potential impressed on the base electrode of the transistor 28 becomes sufficiently positive, the transistor 28 begins to conduct.

As the transistor 28 becomes more conductive, its collector current increases and the collector voltage becomes less positive due to the drop through the winding 20. In other words, the collector voltage becomes more negative under this set of circumstances. This voltage is coupled through the capacitor 36 and drives the base of the transistor 24 more negative and causes a decrease in collector-emitter current through the transistor 24. This action raises the collector voltage of the transistor 24 in a positive direction because of the decrease in current through the winding 18. The increase in the collector voltage is coupled through the capacitor 32 and appears across the resistors 42 and 30. The collector current through the transistor 28 increases until the transistor 28 is cut off. The transistor 24 remains cut off until the capacitor 36 discharges through its resistor 28.

FIGURE 2, more specifically the waveform 50, illustrates what takes place when the core 14 is centrally located with respect to the windings 18 and 20. In other words, the oscilloscope 46 is connected so as to display the voltage waveform that exists when the transistor 24 is first conducting, this being the negative portion of the waveform 50, and then positive portion when the transistor 24 is cut off and its collector electrode is then connected directly to the positive side of the battery 22. It is important to note, however, that the negative and positive portions of the waveform depicted in FIGURE 2 are for equal time periods.

Should there be a decrease in the pressure sensed by the bellows 10, then the core 14 would move to the left and would increase the inductance of the winding 18 while decreasing the inductance of the winding 20. This action results in the waveform 52 pictured in FIGURE 3. The transistor 24 still conducts but does so for a shorter period of time because the inductance of the winding 20 decreases so that the collector current through the transistor 28 can increase fore rapidly. Stated somewhat differently, there is not the "choking" action that develops when more of the core 14 magnetically influences the turns or coils of the winding 20. The converse is true when the core 14 moves to the right, as it will do when the pressure in the bellows 10 increases. This waveform 54 is illustrated in FIGURE 4.

With the transistors 24 and 28 conducting for equal time periods, it follows that the voltage impressed across the capacitor 44 will be zero. In other words, the terminal A is made more positive when the transistor 24 is conducting, but if the transistor 28 conducts for the same period of time but immediately thereafter, then the terminal B becomes more positive and the net effect is a zero reading on the voltmeter 48. On the other hand, when the potential at the terminal A is positive for a lesser period of time than that at the terminal B, then the voltmeter will read more positive, the needle being deflected upscale or in a positive direction. The angle through which the indicating needle of the voltmeter 48 moves will be representative of the amount of core displacement.

The curves shown in FIGURE 5 are believed to demonstrate very vividly the voltage read on the voltmeter 48 for different voltages appearing at the terminals A and B. Also, the curve 56, as is true for the curve 58, is not linear, but the arithmetic sum of the two curves does result in a linear configuration as indicated by the straight line labeled 60. The voltmeter 48, of course, measures the arithmetic sum and would read zero at the null position and a maximum positive value when the core 14 is shifted to the left, and will read negatively when shifted to the right, all as indicated by the line 60.

While the transducer can oscillate at any preferred frequency, one frequency that has been found satisfactory in actual practice is a frequency of 20 kilocycles. Obviously, the specific frequency will depend on the circuit parameters. Likewise, the power supply is susceptible to variation. One such power supply has required five milliamps and a 10 volt source of potential which would be provided by the battery 22. Also, the voltages measured by the voltmeter 48 can be considered on the order of 2.5 volts when the core 14 is displaced 0.10 inch to the left and —2.5 volts when the core 14 is displaced 0.10 inch to the right from a null position intermediate the windings 18 and 20.

I claim:
1. An electromechanical transducing system comprising a direct current voltage source, first and second transistors each having a collector, emitter and base, a first winding connected between one side of said voltage source and the collector of said first transistor, a second winding connected between said one side of said voltage source and the collector of said second transistor, a pair of cross-coupling networks each including a resistor and a capacitor in parallel therewith, one of which networks connects the collector of said first transistor to the base of said second transistor and the other of which networks connects the collector of said second transistor to the base of said first transistor, a resistor connected between the emitter of said first transistor and the other side of said voltage source, a resistor connected between the emitter of said second transistor and said other side of said voltage source, an additional resistor connected between the base and emitter of each of said transistors, a core movable relative to said first and second windings so as to change the relative inductance of said windings and thereby influence the relative conductive periods of time of said transistors with respect to each other, a capacitor connected between said emitters, and a direct current voltmeter connected across said emitters and said last-mentioned capacitor for providing an indication of the relative conductive time periods, whereby said voltmeter provides an indication of the position of said core member.

References Cited

UNITED STATES PATENTS

| 2,759,104 | 8/1956 | Skellett | 331—113 |
| 2,907,991 | 10/1959 | Van Allen | 340—207 |
| 3,061,800 | 10/1962 | Matzen | 331—113 XR |
| 3,341,788 | 9/1967 | Nishioka | 331—144 XR |
| 2,487,523 | 11/1949 | Coake | 324—34 |
| 3,253,153 | 5/1966 | Stoddard | 331—113 |

RUDOLPH V. ROLINEC, Primary Examiner

A. E. SMITH, Assistant Examiner

U.S. Cl. X.R.

331—65